US009334797B2

(12) United States Patent
Velazquez

(10) Patent No.: US 9,334,797 B2
(45) Date of Patent: May 10, 2016

(54) SYSTEM FOR A MECHANICAL CONVERSION OF AN INTERNAL COMBUSTION ENGINE OF 4 STROKES INTO 8 STROKES

(71) Applicant: Luis Alberto Velazquez, Buenos Aires (AR)

(72) Inventor: Luis Alberto Velazquez, Buenos Aires (AR)

( * ) Notice: Subject to any disclaimer, the term of this patent is extended or adjusted under 35 U.S.C. 154(b) by 0 days.

(21) Appl. No.: 14/696,743

(22) Filed: Apr. 27, 2015

(65) Prior Publication Data

US 2015/0330296 A1    Nov. 19, 2015

Related U.S. Application Data

(60) Provisional application No. 61/993,818, filed on May 15, 2014.

(51) Int. Cl.
| | |
|---|---|
| *F02D 15/02* | (2006.01) |
| *F02B 69/06* | (2006.01) |
| *F02B 75/02* | (2006.01) |
| *F16J 7/00* | (2006.01) |
| *F02B 75/04* | (2006.01) |
| *F02B 41/04* | (2006.01) |

(52) U.S. Cl.
CPC ............. *F02B 69/06* (2013.01); *F02B 75/02* (2013.01); *F02B 75/021* (2013.01); *F02B 75/045* (2013.01); *F16J 7/00* (2013.01); *F02B 41/04* (2013.01); *F02B 2075/027* (2013.01); *Y10T 29/49718* (2015.01)

(58) Field of Classification Search
CPC ...... F02B 75/045; F02B 75/021; F02B 75/02; F02B 69/06; F02B 41/04; F02B 2075/027; F16J 7/00; Y10T 29/49718
USPC .................................... 123/78 E, 48 B, 197.3
See application file for complete search history.

(56) References Cited

U.S. PATENT DOCUMENTS

| | | | |
|---|---|---|---|
| 1,406,886 A | 2/1922 | Meyer | |
| 1,747,091 A | 2/1930 | Nikola | |
| 2,127,361 A | 8/1938 | Hlasney | |
| 4,370,901 A | 2/1983 | Bolen | |
| 4,802,382 A * | 2/1989 | Nissels | 74/579 R |
| 4,864,975 A * | 9/1989 | Hasegawa | 123/48 B |
| 4,890,588 A | 1/1990 | Tillman | |
| 5,245,962 A * | 9/1993 | Routery | 123/197.3 |
| 5,682,853 A | 11/1997 | Hull | |
| 2011/0030650 A1 * | 2/2011 | Wilkins | 123/197.3 |
| 2011/0120421 A1 | 5/2011 | Engineer | |

* cited by examiner

*Primary Examiner* — Marguerite McMahon
(74) *Attorney, Agent, or Firm* — Evelyn A Defillo; Defillo & Associates, Inc.

(57) ABSTRACT

A converting mechanical system including a dual connecting rod having a top section adapted to be pivotally connected to a piston on a conventional internal combustion engine and a bottom section adapted to be connected to a crankshaft of a conventional internal combustion engine. A support surrounds each dual connecting rod and includes a retractable device. A decoupling device is adapted to be located on the crankshaft a conventional internal combustion engine. The dual connecting rod has a first working position and in which the dual connecting rod is rigid and connected to the crankshaft when the piston moves. In the second working position, the dual connecting rod disconnects the crankshaft from the piston by action of the decoupling device.

9 Claims, 14 Drawing Sheets

CORTE A - A

CORTE A - A

SYSTEM FOR A MECHANICAL CONVERSION OF AN INTERNAL COMBUSTION ENGINE OF 4 STROKES INTO 8 STROKES

CROSS-REFERENCE TO RELATED APPLICATIONS

This application claims the benefit of priority to U.S. Provisional Application No. 61/993,818 filed May 15, 2014, the contents of which are incorporated herein by reference.

FIELD OF THE INVENTION

The present invention refers to an internal combustion engine. More specifically, the present invention refers to an internal combustion engine having a mechanical conversion system that converts a 4 strokes standard internal combustion engine into an 8 strokes engine. Furthermore, the present invention refers to the elements that form part of the mechanical conversion system.

BACKGROUND INFORMATION

Internal combustion engines (IC engines) use either a 2 strokes or a 4 strokes thermodynamic cycle. As can be seen in FIG. 1, a standard internal combustion engine basically includes a cylinder 2 containing a piston 4 affecting a reciprocal movement which is converted into a rotative movement by means of a connecting rod 6 and a crankshaft 8.

In a 4 strokes internal combustion engine, the piston completes four separate strokes which constitute a single thermodynamic cycle. A stroke refers to the full travel of the piston along the cylinder, in either direction.

FIG. 1 shows the four separate strokes of a conventional IC engine:

Intake stroke: in this stroke, the piston 4 begins at top dead center (TDC). The piston 4 descends from the top of the cylinder 2 to the bottom of the cylinder, increasing the volume of the cylinder 2. A mixture of fuel and air is forced by atmospheric (or greater) pressure into the cylinder through the intake valve 3.

Compression stroke: with both intake 3 and exhaust valves 5 closed, the piston 4 returns to the top of the cylinder 2 compressing the air or fuel-air mixture into the cylinder head.

Combustion stroke: this is the start of the second revolution of the cycle. While the piston 4 is close to top dead center (TDC), the compressed air-fuel mixture in a gasoline engine is ignited, by a spark plug 7. The resulting pressure from the combustion of the compressed fuel-air mixture forces the piston 4 back down toward bottom dead center (BDC).

Exhaust stroke: during the exhaust stroke, the piston 4 returns to the top dead center (TDC) while the exhaust valve 5 is open. This action expels the spent fuel-air mixture through the exhaust valve(s).

Two strokes IC engines are also very common, but they are less efficient and emit more noxious chemicals than a 4 strokes engine.

Many improvements have been made to IC engines over the years to improve the engine performance. The improvements basically try to prolong the cycles of the conventional strokes by using extendable connecting rods, using absorbing springs, using support pins for the piston, using long or short piston runs, or oval crankshafts. Unfortunately, the known prior art improvements are generally characterized by relatively complex, multiple linkage systems which would increase power loss due to added friction and inertia of the multitude of moving parts.

There is a need for a system that improves the engine performance without using complex and multiple linkage systems.

SUMMARY OF THE INVENTION

The present invention relates to a converting mechanical system including a dual connecting rod having a top section and a bottom section, the top section of the dual connecting rod is adapted to be pivotally connected to a piston on a conventional internal combustion engine, the bottom section of each dual connecting rod is adapted to be connected to a crankshaft of a conventional internal combustion engine; a support surrounding each dual connecting rod, the support including a retractable device; a decoupling device adapted to be located on the crankshaft a conventional internal combustion engine; the dual connecting rod has a first working position and a second working position, in the first working position the dual connecting rod is rigid and connected to the crankshaft when the piston moves, in the second working position the dual connecting rod disconnects the crankshaft from the piston by action of the decoupling device, the first section of dual connecting rod remains attached to the piston and is stationary at a beginning of each dead center of a conventional internal combustion engine, the second section of dual connecting remains attached to the crankshaft and is mobile, the piston rests on the support, the dual connecting rod attaches the crankshaft to the piston at an end of each dead center of a conventional internal combustion engine.

In addition, the present invention relates to an internal combustion engine including at least one cylinder; an intake valve connected to each cylinder to admit air into each cylinder; an exhaust valve connected to the cylinder to release gases out of each cylinder; a piston operatively connected to each one of the cylinders, each piston having a first end and a second end, the first end of each piston is connected to the corresponding cylinder; a crankshaft having a first end and a second end, the first end of the crankshaft designed to be connected to an external force device; a converting mechanical system including: a dual connecting rod having a top section and a bottom section, the top section of each dual connecting rod is pivotally connected to the corresponding piston, the bottom section of each dual connecting rod is connected to the second end of the crankshaft; a support surrounding each dual connecting rod, the support including a retractable device; and a decoupling device located on the crankshaft; the dual connecting rod has a first working position and a second working position, in the first working position the dual connecting rod is rigid and connected to the crankshaft when the piston moves, in the second working position the dual connecting rod disconnects the crankshaft from the piston by action of the decoupling device, the first section of dual connecting rod remains attached to the piston and is stationary at a beginning of each dead center of a conventional internal combustion engine, the second section of dual connecting remains attached to the crankshaft and is mobile, the piston rests on the support, the dual connecting rod attaches the crankshaft to the piston at an end of each dead center of a conventional internal combustion engine.

Furthermore, the present invention relates to a method for converting a 4 stroke internal combustion engine into an 8 stroke internal combustion engine, the method comprising the steps of: 1) placing on an internal combustion engine a mechanical system, the internal combustion engine including at least one cylinder, an intake valve connected to each cylinder to admit air into each cylinder; an exhaust valve connected to the cylinder to release gases out of each cylinder, a piston operatively connected to each one of the cylinders, each piston having a first end and a second end, the first end of each piston is connected to the corresponding cylinder, a crankshaft having a first end and a second end, the first end of the crankshaft designed to be connected to an external force device; the mechanical system including: a dual connecting rod having a top section and a bottom section, the top section of each dual connecting rod is pivotally connected to the corresponding piston, the bottom section of each dual connecting rod is connected to the second end of the crankshaft; a support surrounding each dual connecting rod, the support including a retractable device; and a decoupling device located on the crankshaft; and wherein the dual connecting rod has a first working position and a second working position, in the first working position the dual connecting rod is rigid and connected to the crankshaft when the piston moves, in the second working position the dual connecting rod disconnects the crankshaft from the piston by action of the decoupling device, the first section of dual connecting rod remains attached to the piston and is stationary at a beginning of each dead center of a conventional internal combustion engine, the second section of dual connecting remains attached to the crankshaft and is mobile, the piston rests on the support, the dual connecting rod attaches the crankshaft to the piston at an end of each dead center of a conventional internal combustion engine; wherein the top section of the dual connecting rod includes a pin mounted on a sliding slot supported on the retractable device; wherein the bottom section of the dual connecting rod includes: a head having a hole, the hole houses a crankshaft stump; a fixed trigger that actions the release of the retractable device on the support by activating a stopper to release the piston; and a decoupling cam located near the head, the decoupling device rotates the decoupling cam to disconnect the crankshaft from the piston; 2) creating an intake stroke, the intake stroke is created when the piston moves and the dual connecting rod is rigid and elongated, the top section of the dual connecting rod when is locked with the bottom section of the dual connecting rod forming a rigid unit with the piston, the connecting rod, and the crankshaft; 3) creating a bottom dead time, the bottom dead time is created when the dual connecting rod uncouples the piston and the crankshaft and the top section and bottom section of the dual connecting rod are disconnected; 4) creating a compression stroke, the compression stroke is created when the piston moves, the dual connecting rod is rigid and short, the top section and the bottom section of the dual connecting rod are in contact forming a rigid unit with the piston, the connecting rod, and the crankshaft; 5) creating a first top dead time, the first top dead time is created when the piston is disconnected from the crankshaft, the top section and the bottom section of the dual connecting rod is disconnected, and the piston, the dual connecting rod, and the crankshaft are disconnected; 6) creating a combustion stroke, the combustion stroke is created when the piston moves and the dual connecting rod is rigid and elongated; 7) creating a second bottom dead time, the second bottom dead time is created the bottom section of the dual connecting rod that is connected to the crankshaft continues rotating, when the dual connecting rod reaches its minimum amplitude; 8) creating an exhaust stroke, the exhaust stroke is created when the dual connecting rod is short and rigid; and 9) creating a second top dead time, the second top dead time is created when the piston is disconnected from the crankshaft, the top section and the bottom section of the dual connecting rod is disconnected, and the piston, the dual connecting rod, and the crankshaft are disconnected.

BRIEF DESCRIPTION OF THE FIGURES

For further clarity and understanding of the present invention, it is shown in different figures in which it is represented according to the preferred embodiments only as an example.

DETAILED DESCRIPTION OF THE INVENTION

The present invention refers to a mechanical conversion system 10 for converting a conventional 4 strokes IC engine into an 8 strokes IC engine. All of the components of the system 10 work together and in a synchronized manner to keep the piston stationary in the dead centers (DC) transforming the dead centers (DC) into dead times (DT), for a short period of time, for example, ⅙ of the cycle.

Top dead center (TDC) in the present invention refers to the position when the piston is at the furthest extent of its upward (away from the crankshaft) travel.

Bottom dead center (BDC) in the present invention refers to the position when piston is furthest extent downward (toward the crankshaft).

Dead center (DC) in the present invention refers to the position when crankshaft cannot be turned by the connecting rod, occurring at each end of a stroke when the crank and connecting rod are in the same line.

Dead time (DT) in the present invention refers to the position when the piston is disengaged and rest on the support which creates a new stroke for a conventional IC engine.

Figure 1:
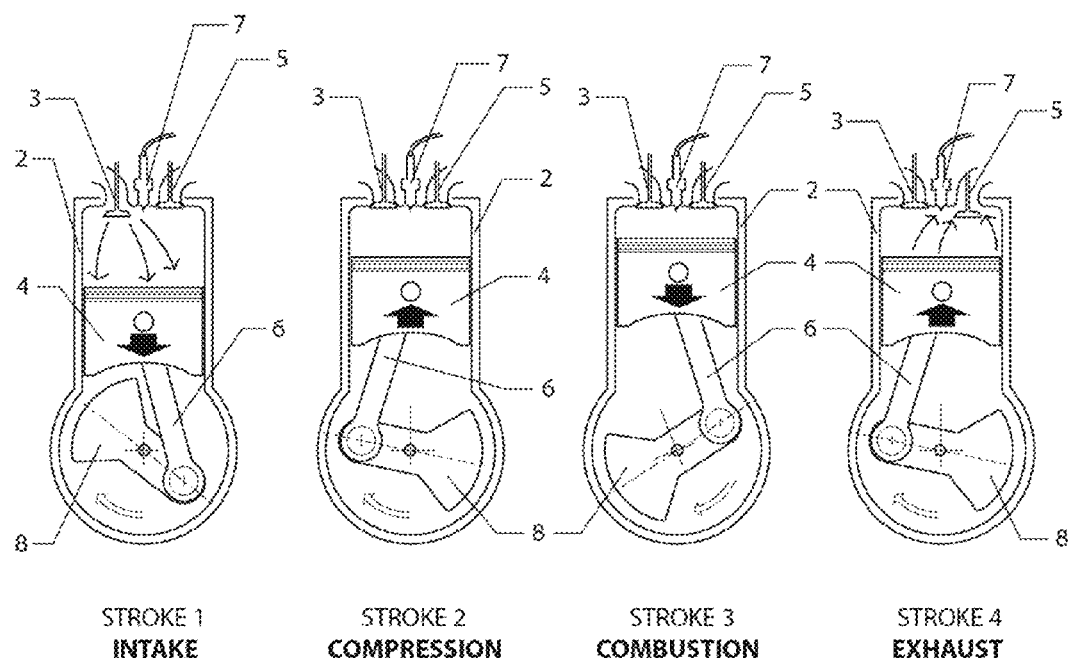
FIG. 1 shows the four separate strokes of a conventional 4 strokes IC engine.
Figure 2:
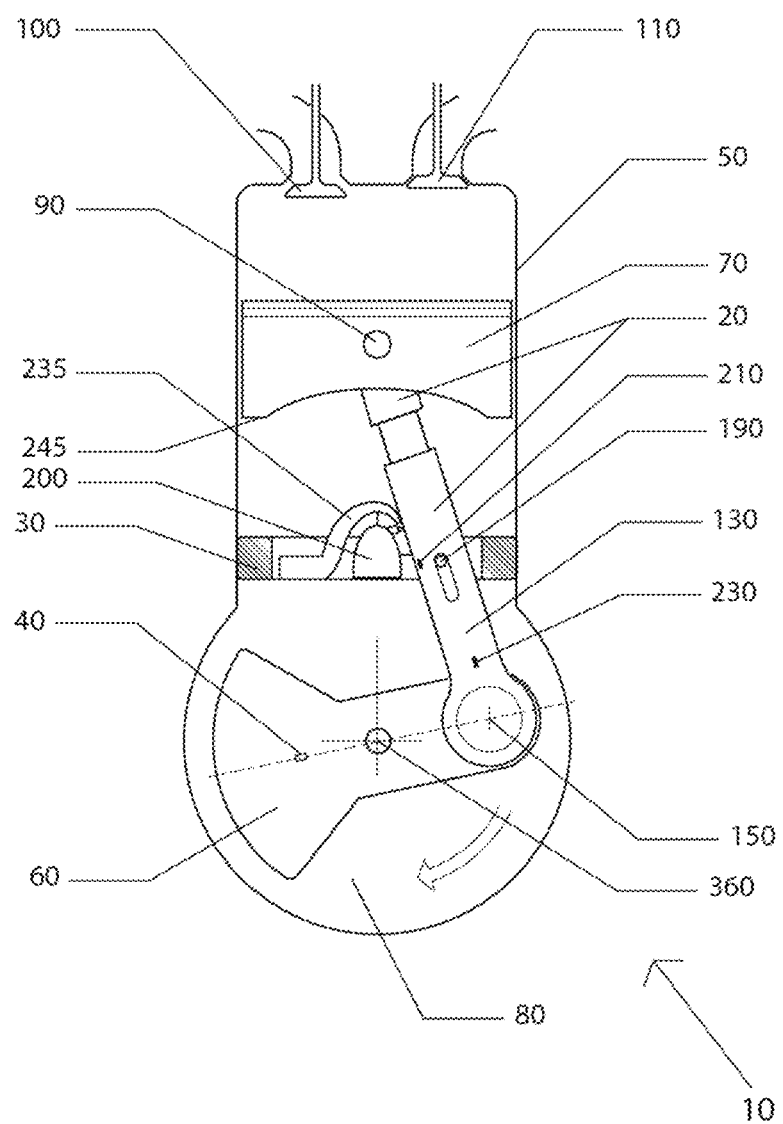
FIG. 2 shows a cross sectional view of an IC engine including the system according to an embodiment of the present invention.

As can be seen in FIG. 2, the mechanical system 10 according to the present invention includes: a dual connecting rod 20, a support 30; and a decoupling device 40.

For simplicity in describing this invention, the figures illustrate only one piston inside one cylinder attached to one crankshaft. This invention may use any number of cylinders and pistons as well as multiple dual connecting rods. The figures are illustrative and are not drawn to scale but schematically depict the method of operating this invention. This engine may be either spark ignited (SI), compression ignited (CI), or utilizing some other means of igniting the combustible mixture. The fuels to be used in this invention include all hydrocarbons as well as hydrogen or mixtures thereof.

FIG. 2 shows a cross sectional view of the a conventional IC engine including the mechanical system 10 according to an embodiment of the present invention. The IC engine generally includes as main components a cylinder 50 in which rotational power is generated by a crankshaft 60 rotated by up-down reciprocation of a piston 70 that is transmitted through a dual connecting rod 20. The crankshaft 60 is housed on a crankcase 80. The piston 70 is pivotally connected to the dual connecting rod 20 by using a pin 90. An intake valve 100 opens to admit air or mixture into the cylinder 50. An exhaust valve 110 opens to allow gases to be released from the cylinder 50.

The dual connection rod 20 may be made of a strong, rigid, and lightweight material. The material may be, for example, steel, titanium, aluminum, carbon fibers, carbon fibers combined with other metals, or mixture thereof.

Figure 3:
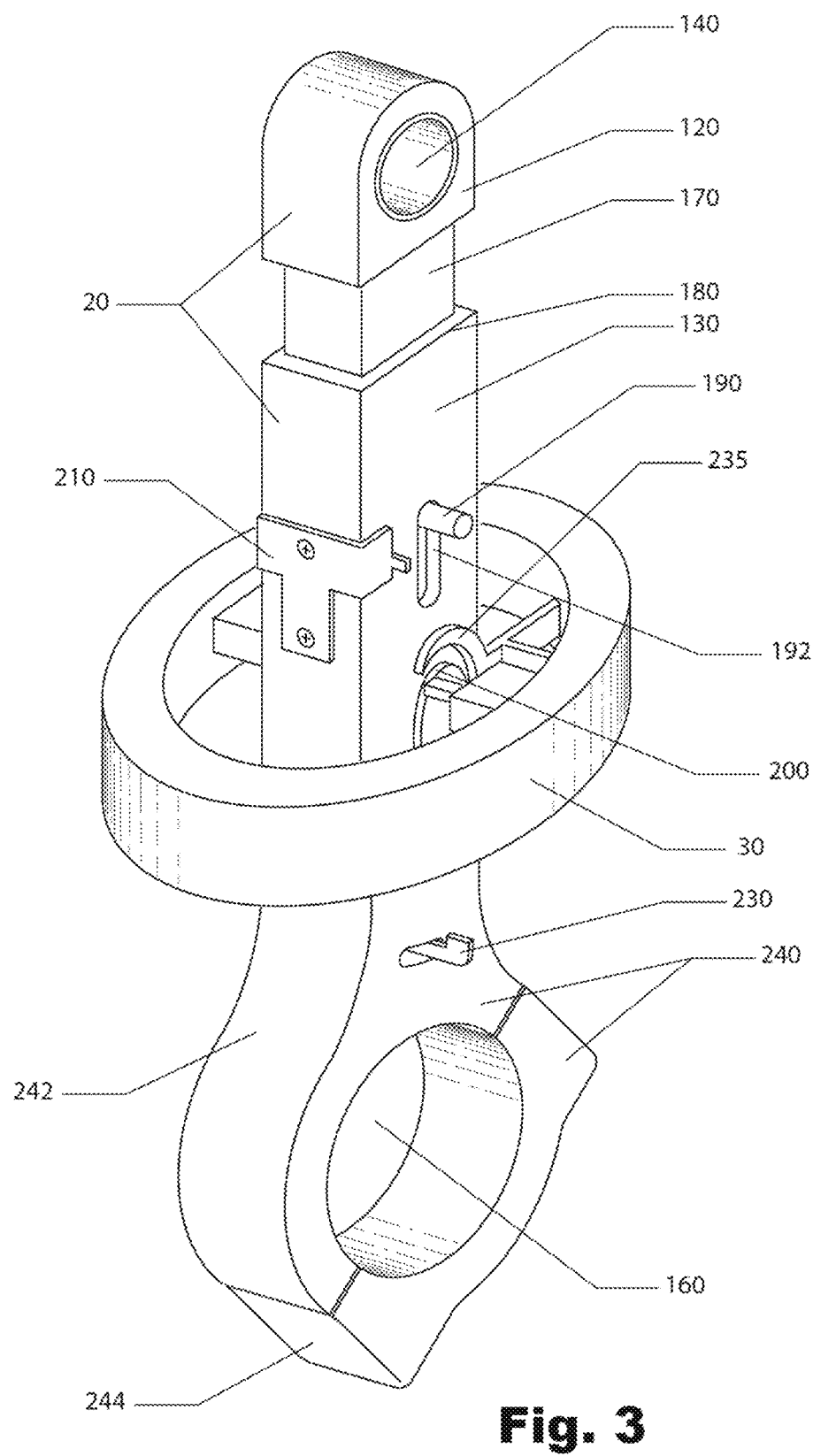
FIG. 3 shows a perspective front view of the dual connecting rod and a piston support according to an embodiment of the present invention.

The dual connecting rod 20 according to the present invention works in two different ways, one is as a rigid connecting rod when the piston 70 is moving and the other way is as a connecting rod that disconnects the crankshaft 60 from the piston 70 during the DT through an internal mechanism. The decoupling occurs when the piston 70 passes through the dead centers. When decoupling from the crankshaft 60, the piston 70 rests on the support 30 and stays stationary starting the DT. After a short time, the dual connecting rod 20 attaches the crankshaft 60 to the piston 70 and this occurs at the end of the DT. To disconnect the piston 70 from the crankshaft 60, the dual connecting rod 20 includes two sections, a top section 120 that is attached to the piston 70 and is stationary and a bottom section 130 that is attached to the crankshaft 60 by using a stump 150 and is mobile. (FIG. 3).

As can be seen in FIGS. 3-7, the dual connecting rod 20 may include the top section 120 and the bottom section 130. The top section 120 and the bottom section 130 may be built-in as slidable pieces or telescopic pieces. The connection between the top section 120 and the bottom section 130 may be mechanical, electro-mechanical, magnetic, electromagnetic, hydraulic, pneumatic or and combination thereof. The connection between the top section 120 and the bottom section 130 may include locking and unlocking internal and/or external devices that will be disclosed later on this application; thus the bottom end 170 of the top section 120 and the top end 180 of the bottom section 130 touch each other or are separate from each other.

The top section 120 of the dual connecting rod 20 may include a hole 140 for housing the pin 90 of the piston 70. The bottom section 130 of the dual connecting rod 20 may be attached to the crankshaft 60 through a stump 150 (FIG. 2) that is placed on the hole 160 located on a head 240 on the bottom section 130 of the dual connecting rod 20.

The top section 120 may include a bottom end 170 and the bottom section 130 may include a top end 180. The bottom end 170 and the top end 180 may be connected during the compression and exhaust strokes. The top section 120 of the dual connecting rod 20 may include a pin 190 mounted on a sliding slot 192 of the bottom section 130 that is supported on the retractable device 200. The pin 190 may hold the piston 70 in the retractable device 200 during the TDT.

The bottom section 130 of the dual connecting rod 20 may include a hole 160 located at the head 240 of the dual connecting rod 20. The hole 160 may house a crankshaft stump 150. In addition, the bottom section 130 may include a fixed trigger 210 that activates the retractable device 200 located on the support 30.

Figure 8:
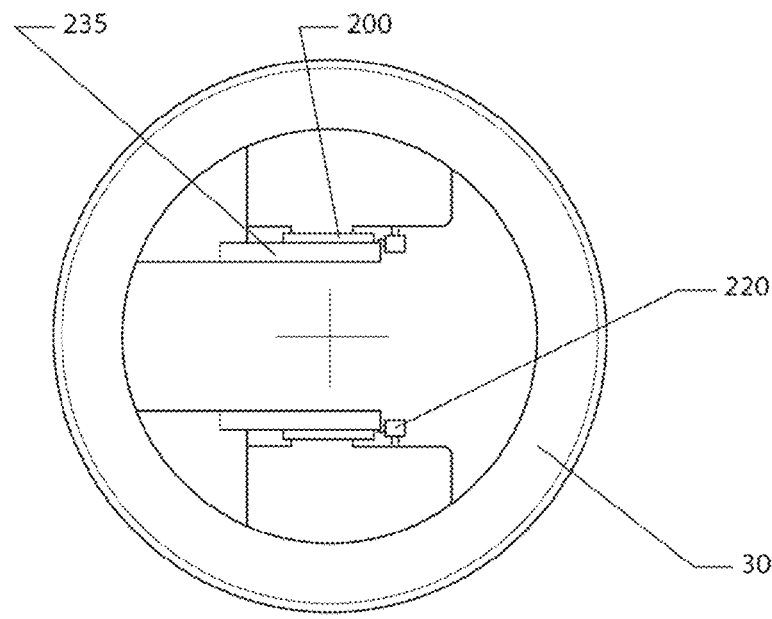
FIG. 8 shows a top view of the support including a retractable device according to an embodiment of the present invention.
Figure 9A:
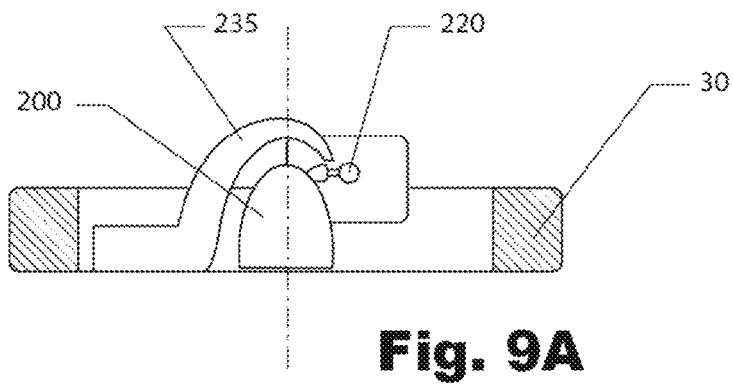
FIG. 9A shows a cross-section view of the support of FIG. 8 showing details of the retractable device in a first position.
Figure 9B:
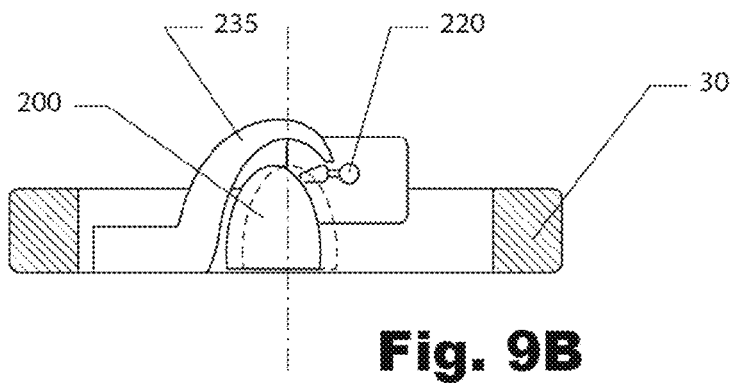
FIG. 9B shows a cross-section view of the support of FIG. 8 showing details of the retractable device in a second position.
Figure 10:
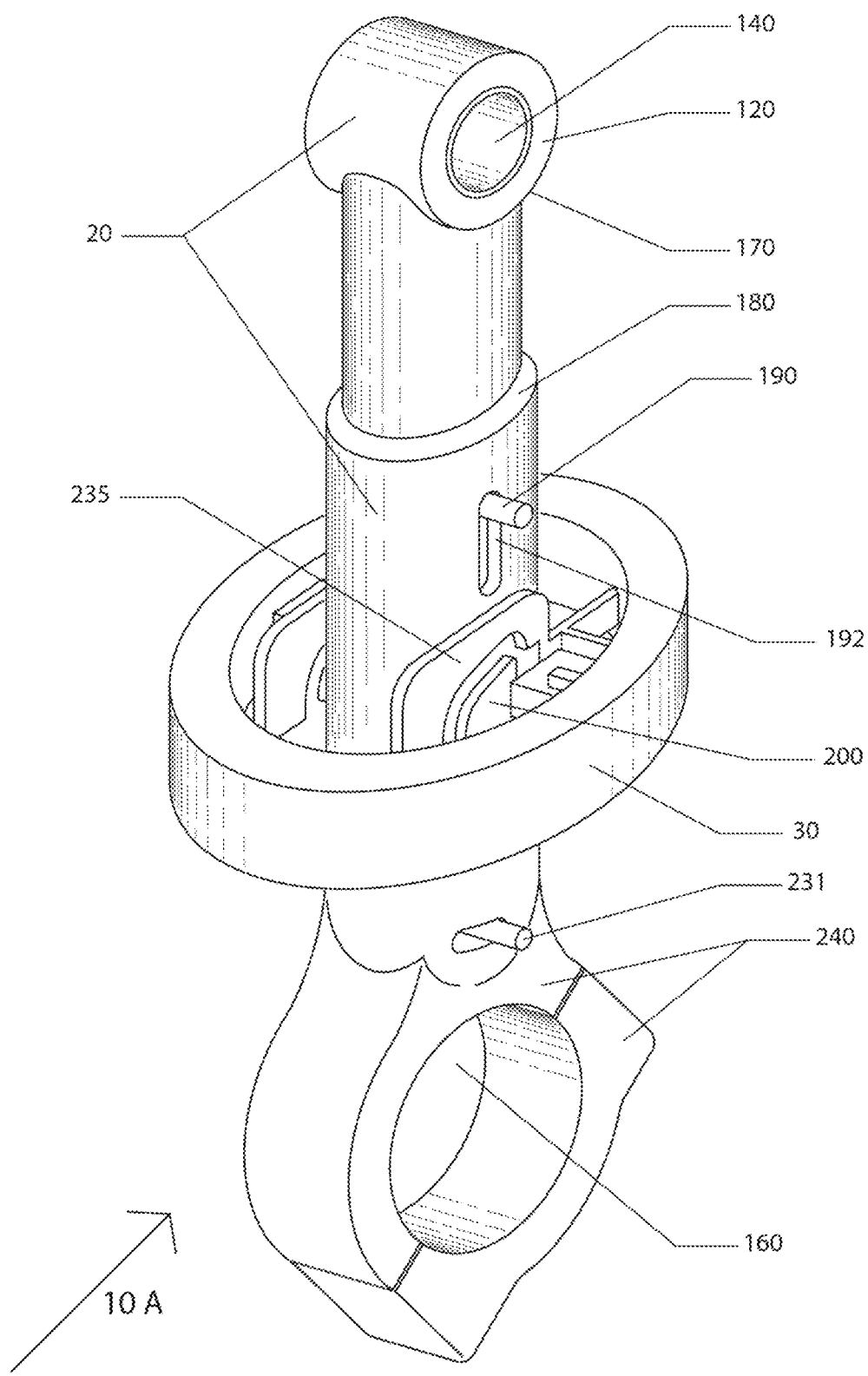
FIG. 10 shows a perspective front view of a mechanical system according to another embodiment of the present invention.
Figures 11, 12:
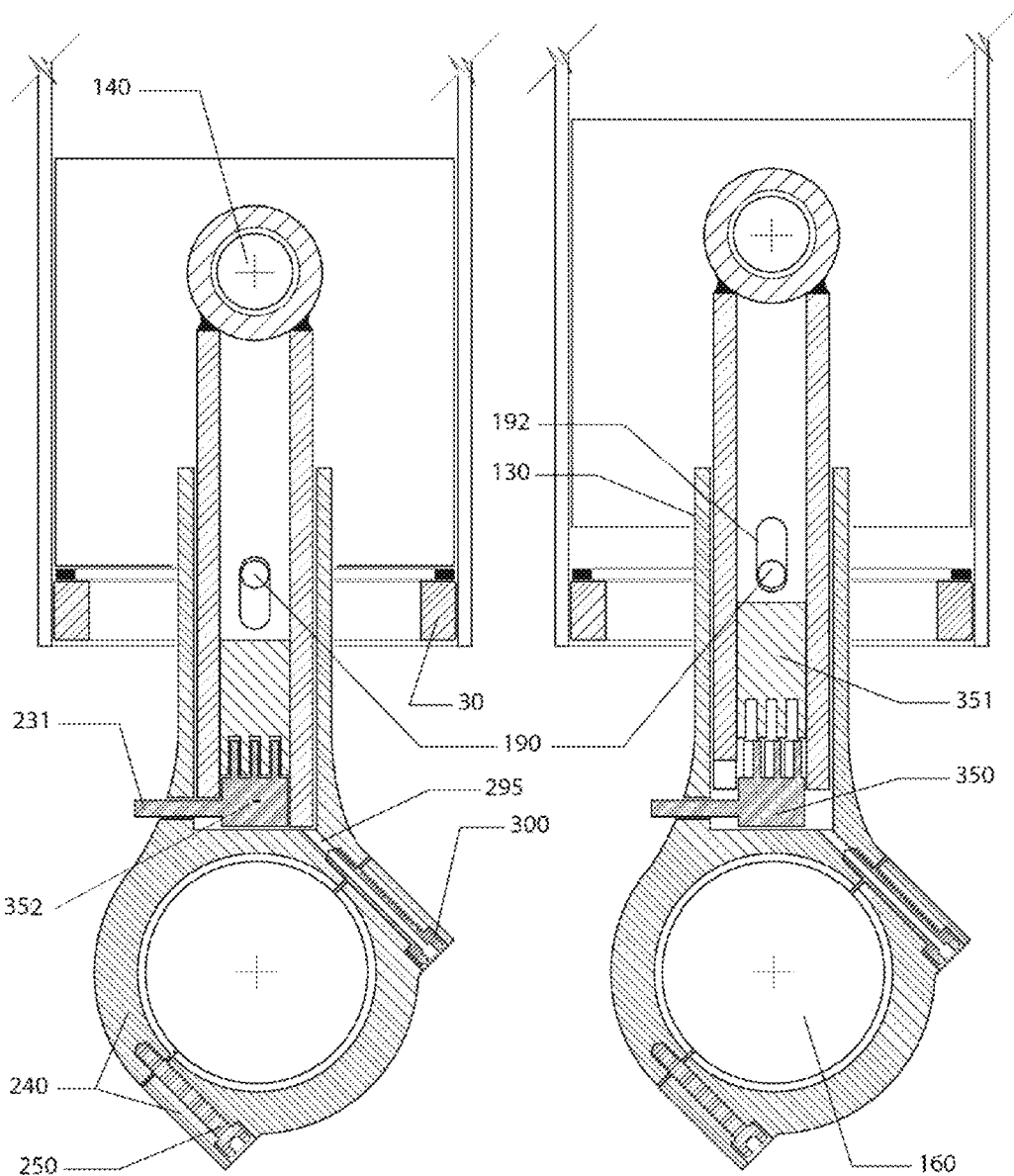
FIG. 11 shows a transversal longitudinal cross-section view of the mechanical system of FIG. 10 during the compression-exhaust stage.
FIG. 12 shows a transversal longitudinal cross-section of the mechanical system of FIG. 10 during the intake-combustion stage.
Figure 13:
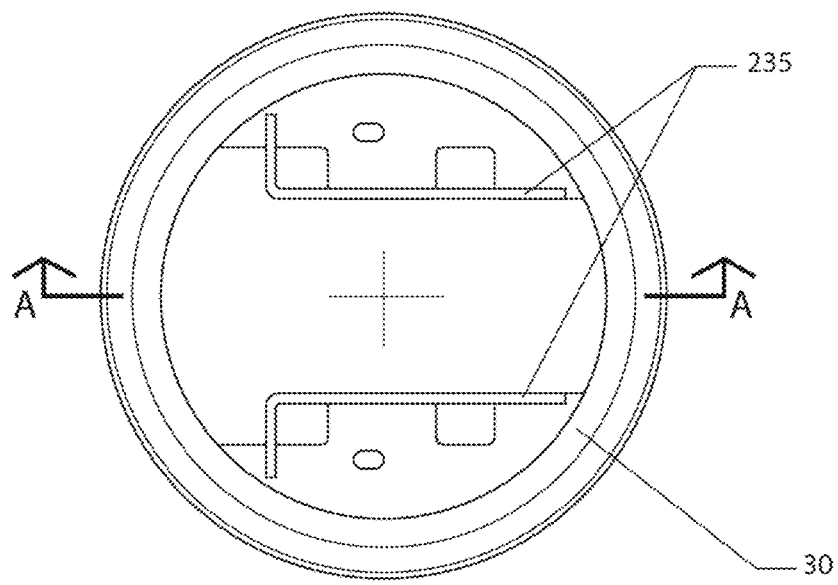
FIG. 13 shows a top view of the support and a retractable device of the mechanical system of FIG. 10.
Figure 14:
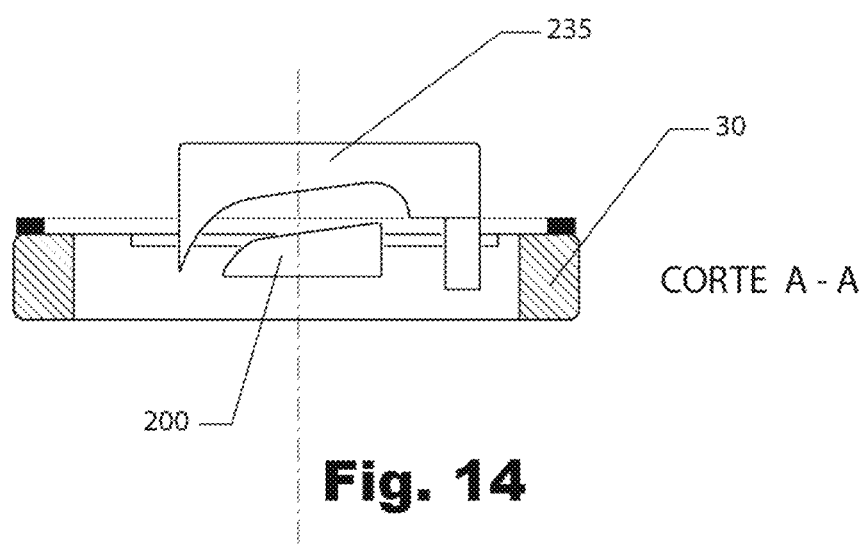
FIG. 14 shows a cross-section view of the support of FIG. 13 showing details of the retractable device in a first position.

The retractable device 200 may include a stopper 220 (FIGS. 8, 9A, 9B) to release the pin 190 of the piston 70 by the trigger 210. The trigger 210 push the stopper 220 to free the 190 of the piston 70. A decoupling cam 230 may be located near the head 240 of the bottom section 130 of the dual connecting rod 20. The decoupling cam 230 may be activated during the BDT to shortened the dual connecting rod 20. The decoupling device 40 located on the exterior of the crankshaft 60, activates the cam 230 to push the fixed box 270 and for the rollers 260 to leave the fixed box 270 allowing the dual connecting rod 20 to start to shorten. The piston 70 is stationary, disconnected from the crankshaft 60 and the surface 245 resting on the support 30. The pin 190 of the support 30 rests on the retractable support 200, disconnecting the dual connecting rod 20 from the crankshaft 60. The bottom section 130 of the dual connecting rod 20 that is connected to the crankshaft 60 continues rotating.

In some embodiments, the head 240 may include a top part 242 and a bottom part 244 connected by at least one fastener 250. In some embodiments, the head 240 may be a unitary piece.

As can be seen in FIGS. 2, 8, 9A, 9B, the retractable device 200 may include an upper guide 235 operatively connected to the pin 190 of the top section 120 of the dual connecting rod 20, a release stopper 220 that may be pulled by the fixed trigger 210 at the end of the DTS, and a skirt 245 rest on the support 30 in the BDT.

When the cycle is in the TDT, the pin 190 rests on the support 30 keeping the piston 70 stationary and independent, the bottom section 130 of the dual connecting rod 20 may continue its movement with the crankshaft 60, until the dual connecting rod 20 reaches its greatest length. In addition, the retractable support 30 has the function of holding the piston 70 during the BDT through the skirt 245 on the support 30.

The decoupling device 40 may be located on the crankshaft 60. The decoupling device 40 may have the function during the crankshaft movement, at the beginning of the BDT, to rotate the decoupling cam 230 to disconnect the crankshaft 60 from the piston 70. The cam 230 pushes the metal sheet 280 and during the rotation, frees the rollers 260 located on the fixed box 270 and the dual connecting rod 20 is free to shortening again.

Figures 6, 7:
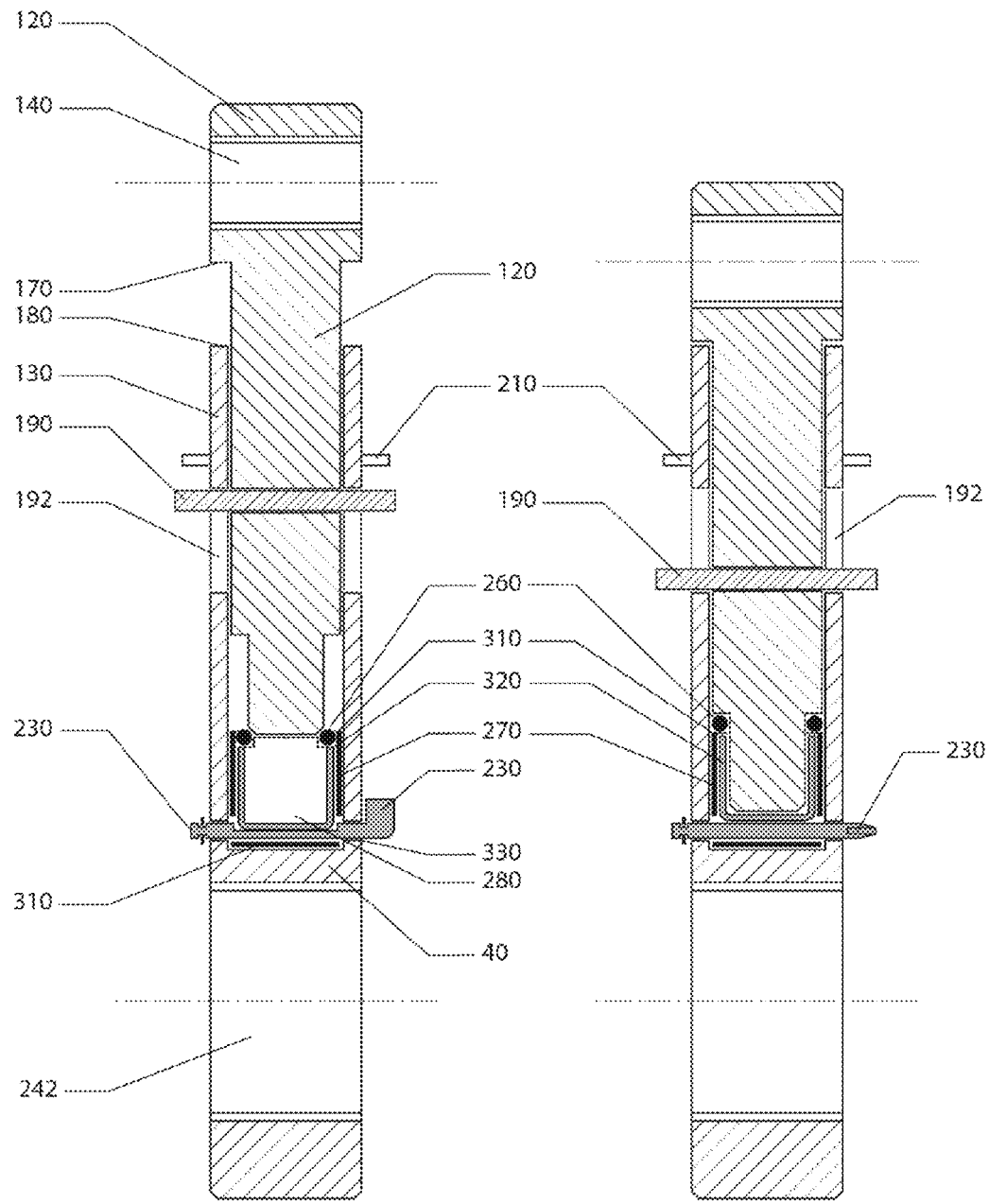
FIG. 6 shows a transversal longitudinal cross-section view of the dual connecting rod of FIG. 3 on the intake-combustion stage.
FIG. 7 shows a transversal longitudinal cross-section view of the dual connecting rod of FIG. 3 on the compression-exhaust stage.

As can be seen in FIGS. 6-7, during the intake-combustion strokes, the dual connecting rod 20 is elongated and is short during the exhaust and compression. Rollers 260 that are introduced into a fixed box 270 to lock the dual connecting rod 20 that at this time is in its major amplitude connecting the piston 70 and the crankshaft 60. The metal sheet 280 holds the rollers 260. In some embodiments, the metal sheet 280 may have a U-shape.

The metal sheet 280 may be responsible for unlocking the connection between the piston 70, dual connecting rod 20, and the crankshaft 60 through the operation of a cam 230 on the decoupling device 40 during the DTB.

Figures 4, 5:
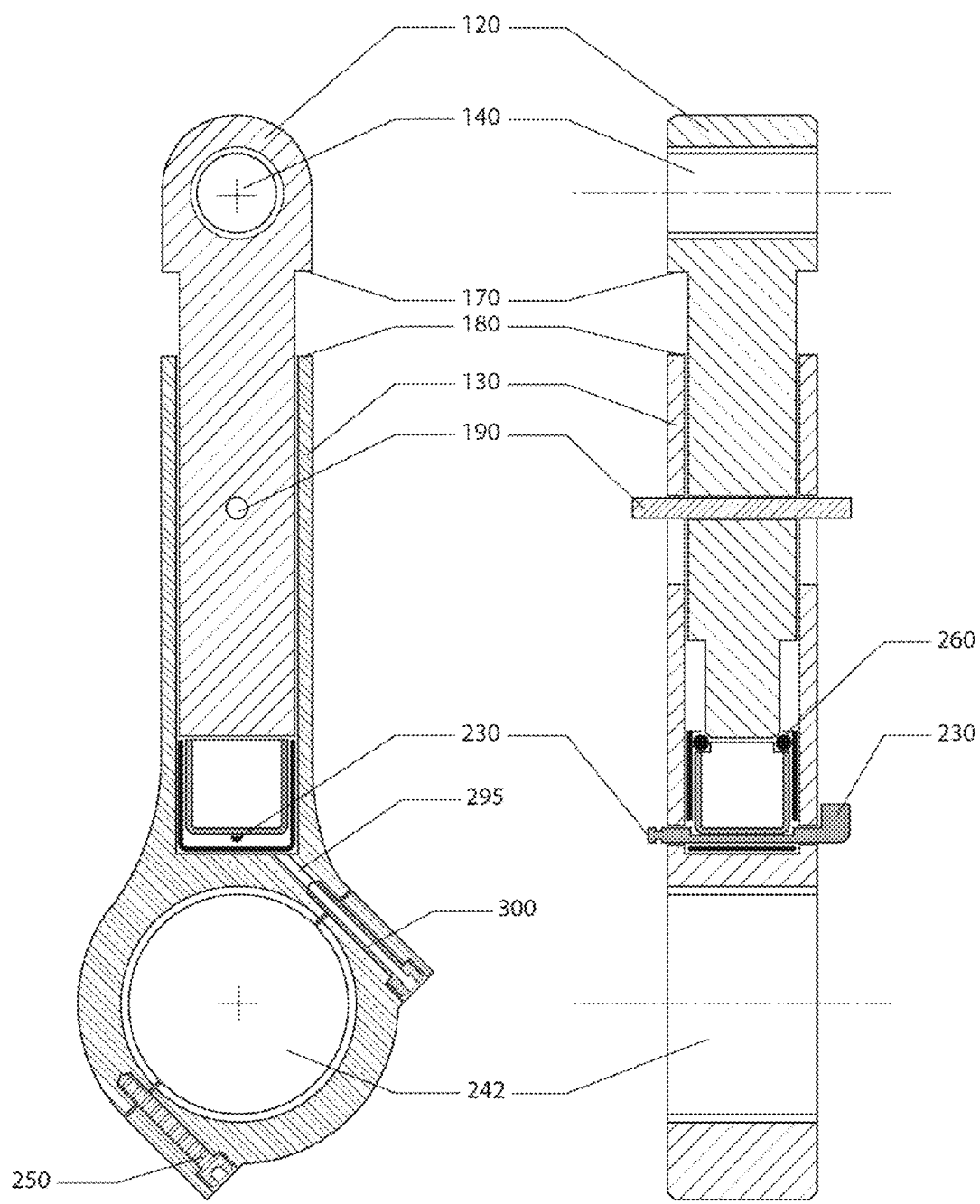
FIG. 4 shows a longitudinal cross-section view of the dual connecting rod of FIG. 3.
FIG. 5 shows a transversal longitudinal cross-section of the dual connecting rod of FIG. 3.

A perforated screw 300 may be use to hold the two part of the head 240. The perforate screw 300 may allow the lubricant oil to circulate through the oil conducting channel 295 to lubricate the parts of the dual connecting rod 20 during its movement. (FIG. 4)

FIGS. 10-14 show a mechanical system 10A according to another embodiment of the present invention The mechanical system 10A may include the same parts as the mechanical system 10. During the coupling and decoupling, the guide 235 is open, the pin 231 pushes the metal sheet 280 turning the gear 350 and the teeth that are in its greater length facing each other by the action of a spring that moves the gear 350.

In this embodiment, the decoupling internal system 40 of the connecting rod 20 is a set of pieces that have the function to leave rigid the connecting rod in its longer and minor lengths. In the system 10, the rollers 260 when the connecting rod reaches its greater length (in the top dead time) is introduced into the spring 320 and stays rigid (coupled) and in the bottom dead time by the pin 231 and the device 40 of the crankshaft the metal sheet 280 pushes the rollers 260 from the spring 320 freeing the dual connecting rod 20 to shortening again. The dual connecting rod 20 in this embodiment is rectangular.

The system 10 A is carried out by means of 2 gears one mobile one and the other fixed which is part of the connecting rod 20. The top section 120 having tooth with the shape of overlapping combs that are inserted one inside the other, it is when the connecting rod 20 is short (Bottom dead time). When the connecting rod (20) reaches its maximum length, the mobile gear rotates driven by a spring 352 housed inside the gear 350 leaving the teeth that have the same length of the elongation faced and leaving the connecting rod 20 rigid (coupled). This occurs in the top dead time. In the bottom dead time, the dual connecting rod 20 disconnect through the device 40 of the crankshaft and the pin 231 is fixed to the gear 350 that rotates the mobile gear and positions of the gear teeth so that the teeth are embedded one within the other and leaving the dual connecting rod 20 in its lower length. The dual connecting rod 20 in this case is round.

FIGS. 18A-18D show a mechanical system 10B according to another embodiment of the present invention The system 10B is carried out by a mobile bolt 630 and a fixed nut 610 that is part of the dual connecting rod 20. When the dual connecting rod 20 is getting elongated, the mobile bolt 630 rotates until the dual connecting rod 20 reaches its greatest length at that time the dual connecting rod 20 stays rigid (coupled) because the mobile bolt 630 cannot rotate in the opposite direction. This is in the top dead time. In the bottom dead time, the device 40 of the crankshaft 60 turns the pin 232 which allows the reverse movement of the mobile bolt 630 thus the dual connecting rod 20 is shortening again.

FIGS. 15A-15H show the cylinder 50, piston 70, dual connecting rod 20, decoupling device 40, valves 100, 110; crankcase 80; circumference 820 which draws the radius formed with the stump 150 and the centerline of the crankshaft 60; crankshaft radio 850 formed by the segment that connects the stump 150 of the crankshaft 60 with the axis 360 of the crankshaft 60 and that is denominated "crankshaft radius"; the arrows indicate the cycle times that correspond according to each one of the views.

Figure 15A:
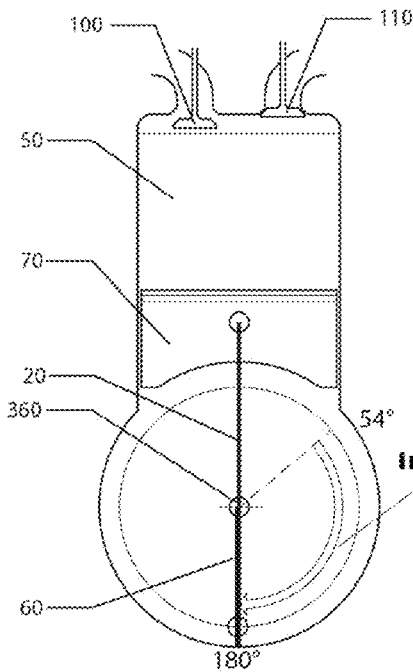
FIG. 15A shows a diagram of the first stroke, the intake, in accordance with the present invention showing that the dual connecting rod is rigid and elongated.

FIG. 15A shows a diagram of the first stroke, the intake, in accordance with the present invention showing that because the piston 70 is moving, the dual connecting rod is rigid and elongated. The top section 120 of the dual connecting rod 20 is locked with the bottom section 130 of the dual connecting rod 20 forming a rigid unit with the piston-connecting rod-crankshaft. The cycle goes from approximately the 54° to 180°.

Figure 15B:
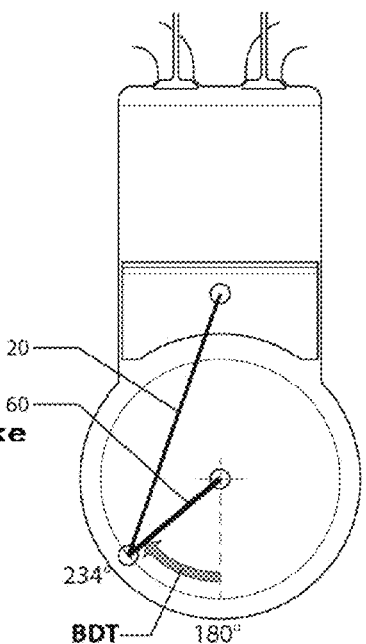
FIG. 15B shows a diagram of the second stroke, bottom dead time BDT, in accordance with the present invention showing that the dual connecting rod uncouples the piston and the crankshaft.

FIG. 15B shows a diagram of the second stroke, bottom dead time BDT, in accordance with the present invention showing that the dual connecting rod 20 uncouples the piston 70 and the crankshaft 60 and the two parts of the dual connecting rod 20 are free, the cycle goes from the 180° until the 234° approximately.

Figure 15C:
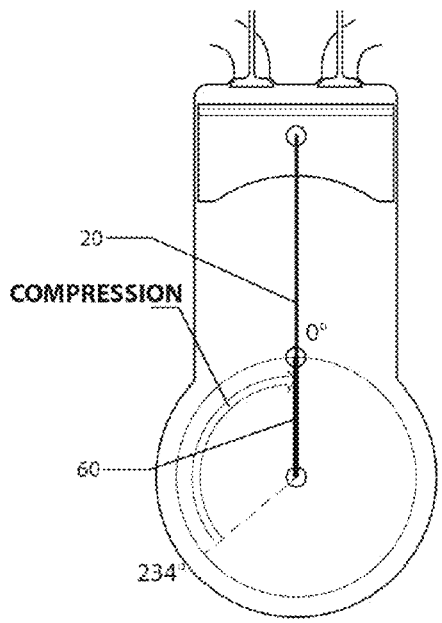
FIG. 15C shows a diagram of the third stroke, the compression, in accordance with the present invention in which the dual connecting rod is rigid and short.

FIG. 15C shows a diagram of the third stroke, the compression, in accordance with the present invention in which because the piston 70 is moving, the dual connecting rod 20 is rigid and short. The top section 120 of the dual connecting rod 20 is in contact with the bottom section 130 of the dual connecting rod 20 forming a rigid unit with the piston-connecting rod-crankshaft. This cycle lasts what it takes to go through the stump, from approximately 234° until the 360°.

Figure 15D:
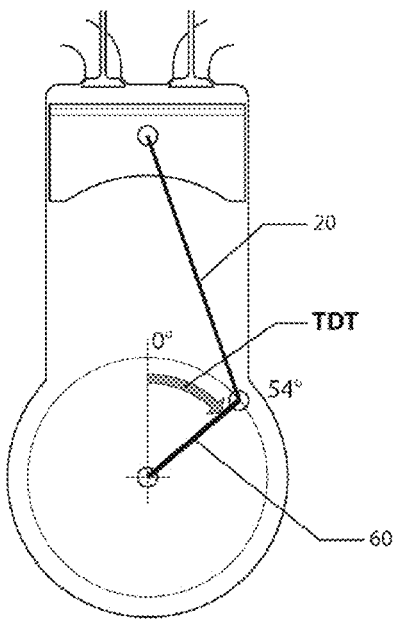
FIG. 15D shows a diagram of the fourth stroke, first top dead time (1 TDT), according to the present invention in which the piston is disconnected from the crankshaft.

FIG. 15D shows a diagram of the fourth stroke, first top dead time (1 TDT), according to the present invention in which the piston 70 is disconnected from the crankshaft 60. The dual connecting rod 20 unlocks, the parts are free and lengthening. Approximately at the 410°, the dual connecting rod 20 is locked. The piston 70-dual connecting rod 20-crankshaft 60 assembly is released. The cycle runs what it takes to go through the stump, from the 360° until the 414° approximately.

Figure 15E:
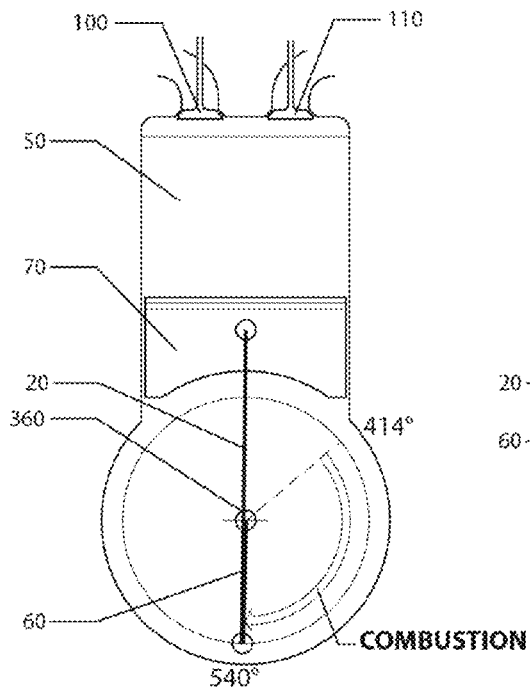
FIG. 15E shows a diagram of the fifth stroke, the combustion, in accordance with the present invention in which the connecting rod is rigid and elongated.

FIG. 15E shows a diagram of the fifth stroke, the combustion, in accordance with the present invention in which the connecting rod is rigid. In this cycle the dual connecting rod 20 is rigid and elongated. The cycle lasts from approximately the 414° up to 540°.

Figure 15F:
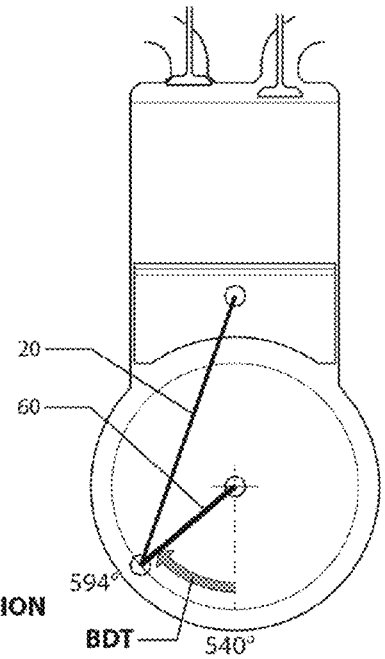
FIG. 15F shows a diagram of the sixth stroke, 2nd bottom dead time (2nd BDT), in accordance with the invention in which the piston and the crankshaft are disconnected, the dual connecting rod is free and short, at about 590°, the parts of the dual connecting rods collide and become rigid.

FIG. 15F shows a diagram of the sixth stroke, 2nd bottom dead time (2nd BDT), in accordance with the invention in which the piston and the crankshaft are disconnected. The two sections of the dual connecting rod are free, not rigid, and shortening. The surface 245 may rest on the support 30, disconnecting the dual connecting rod 20 from the crankshaft 60. The bottom section 130 of the dual connecting rod 20 from the crankshaft 60. The bottom section 130 of the dual connecting rod 20 that is connected to the crankshaft 60 continues rotating. The decoupling device 40 located on the exterior of the crankshaft 60, activates the cam 230 to push the device 280 for the rollers 260 to leave the fixed box 270 allowing the dual connecting rod 20 to start to shorten. The piston 70 is stationary, disconnected from the crankshaft 60 and the surface 245 resting on the support 30. The bottom section 130 of the dual connecting rod 20 that is connected to the crankshaft 60 continues rotating. When the dual connecting rod 20 reaches its minimum amplitude, The stroke lasts for the time that it takes to go through the stump 150, from the 540° to 594° approximately.

Figure 15G:
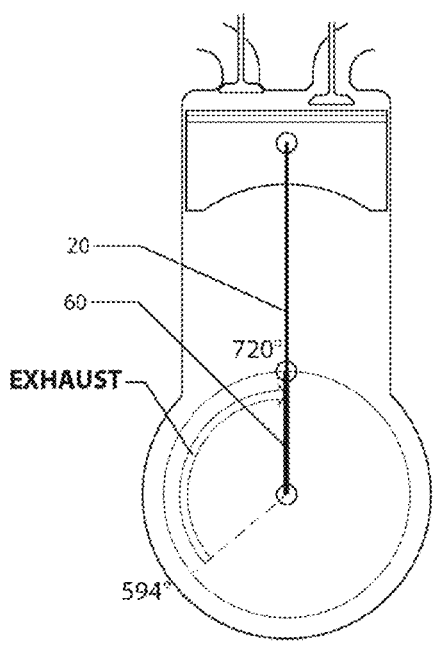
FIG. 15G shows a diagram of the seventh stroke, the exhaust, in accordance with the present invention in which the dual connecting rod is shortened and locked.

FIG. 15G shows a diagram of the seventh stroke, the exhaust, in accordance with the present invention in which the dual connecting rod is short and rigid. The cycle goes from approximately the 594° up to 720°.

Figure 15H:
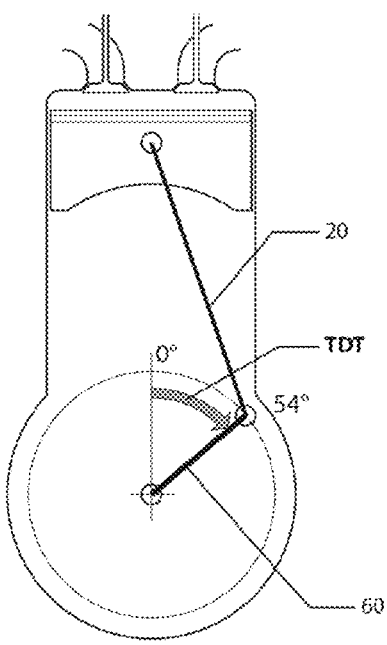
FIG. 15H shows a diagram of the eighth stroke, 2nd top dead time (2nd TDT), in accordance with the present invention in which the dual connecting rod unlocks and the parts are free.

FIG. 15H shows a diagram of the eighth stroke, 2nd top dead time (2nd TDT), in accordance with the present invention in which the dual connecting rod unlocks and the parts are not rigid. Approximately to the 770°, the dual connecting rod 20 is locked. The rollers 260 are accommodated in the cavity 310 pushed by the springs 320, locking in this way the top section 120 with the bottom section 130 of the dual connecting rod 20 and almost instantly as it is locked is released. To be released, the dual connecting rod 20 from the support 30, the trigger 210 of the bottom section 130 activates the stopper 220 allowing the pin 190 to be released from the support 200.

The bottom section 130 of the dual connecting rod 20 connected to the crankshaft continues rotating. Around 4° later the piston-connecting rod-crankshaft assembly is released. It lasts for the time that it takes to go through the stump, from the 720° approximately until the 774°.

Figure 16:
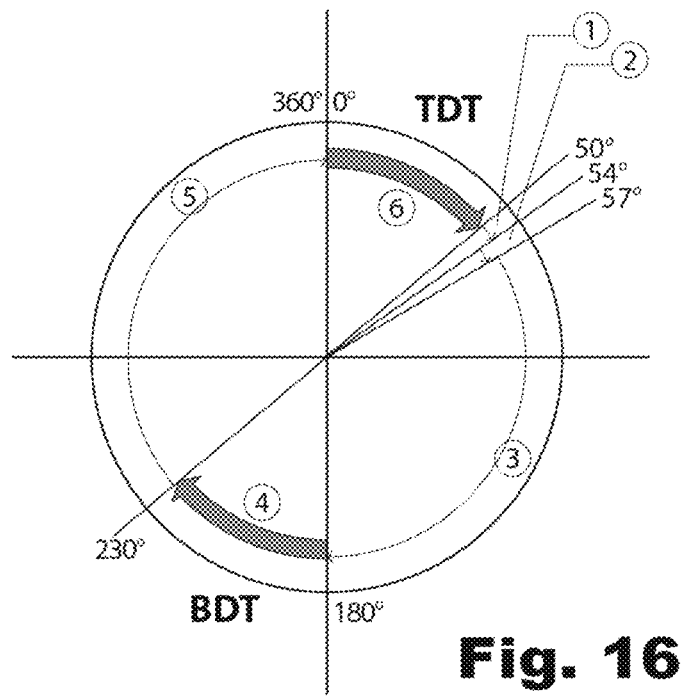
FIG. 16 shows the first 4 strokes of the first cycle according to the present invention.
Figure 17:
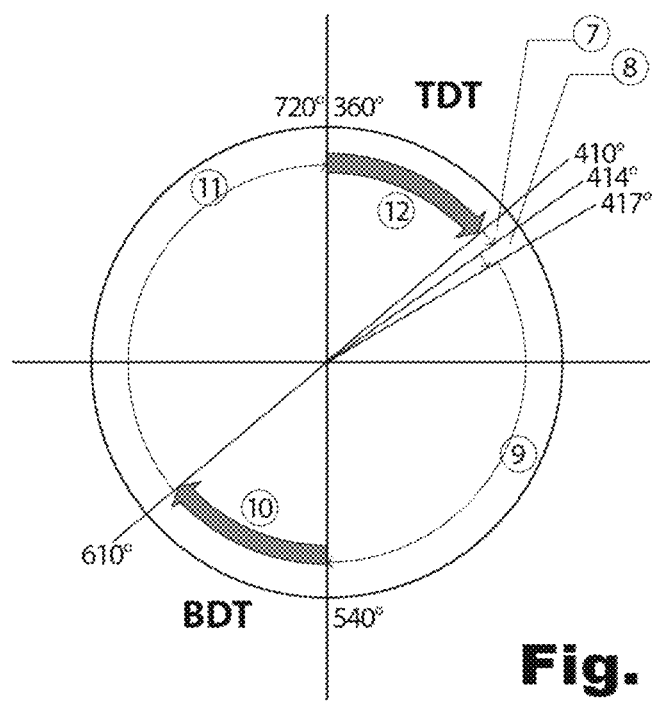
FIG. 17 shows the 4 second times of the second cycle.
Figures 18A, 18B:
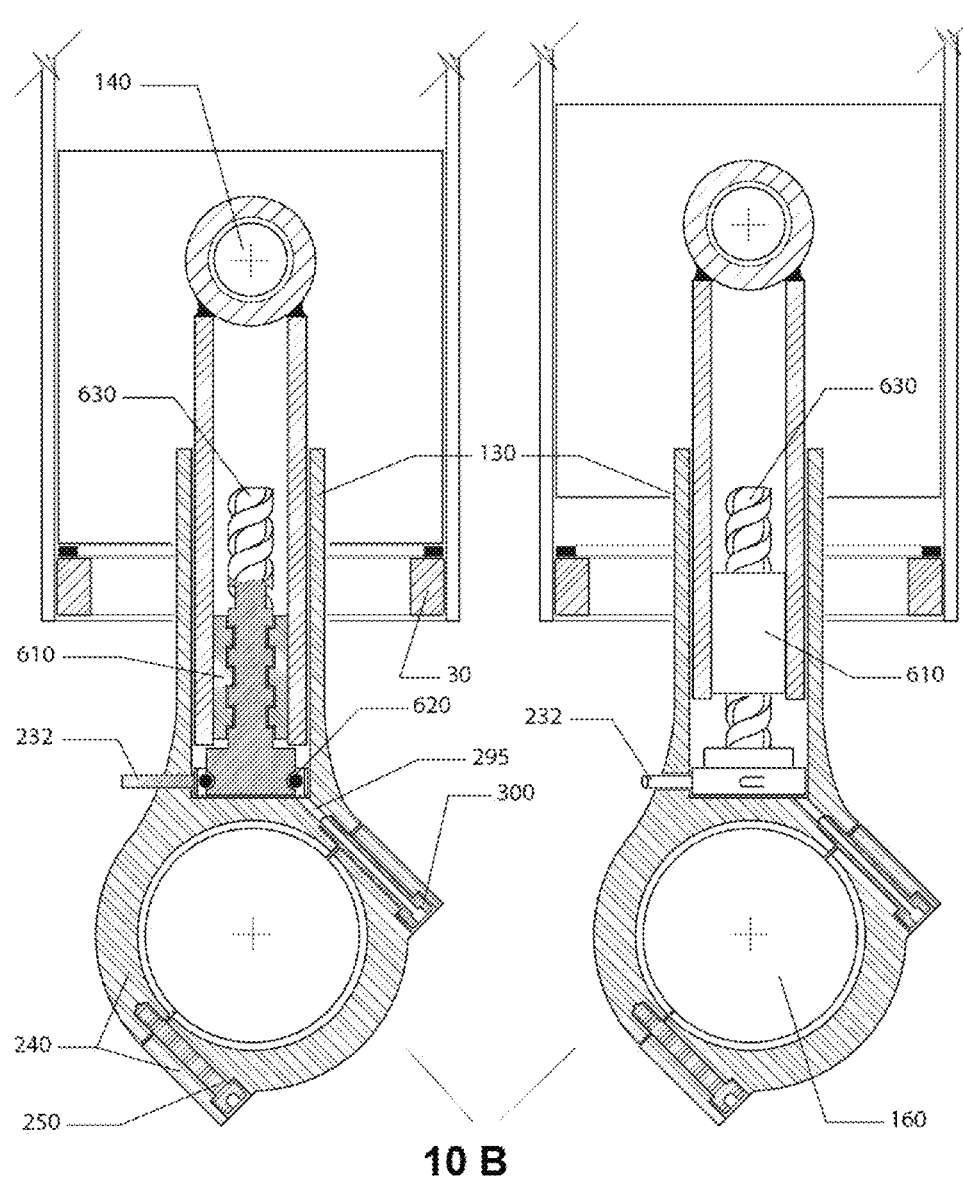
FIG. 18A shows a transversal longitudinal cross-section view of the mechanical according to another embodiment of the present invention in a short position
FIG. 18B shows a transversal longitudinal cross-section view of the mechanical system of FIG. 18A in a long position.
Figure 18C:
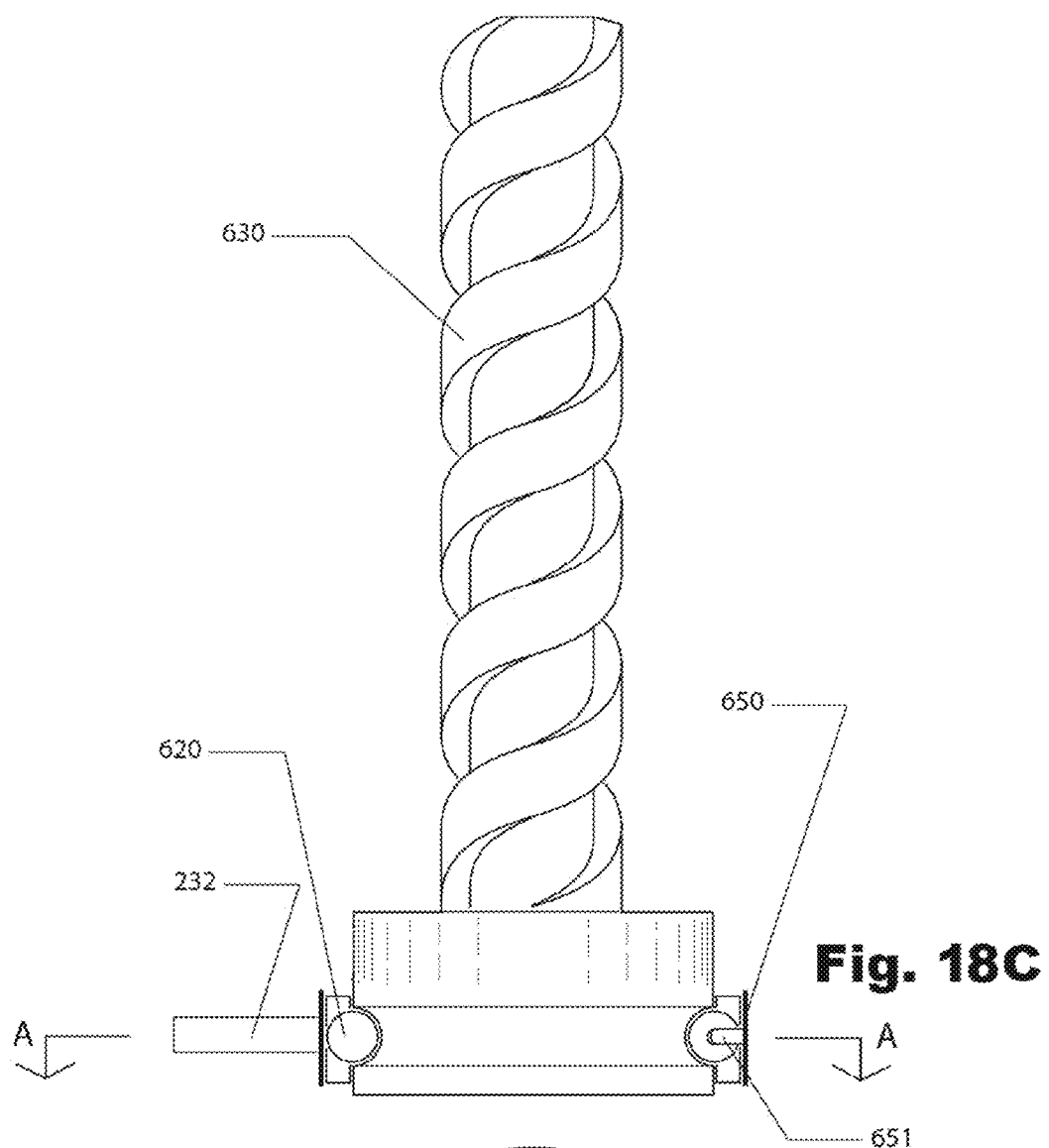
FIG. 18C shows a detailed view of a mechanical system of FIG. 18A.
Figure 18D:
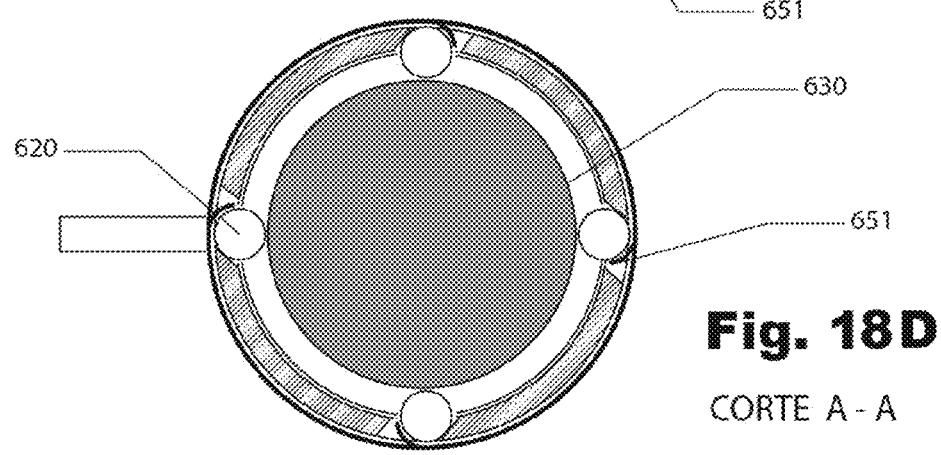
FIG. 18D shows a top cross-sectional view of the support of FIG. 18C showing details of the retractable device.

FIG. 16 shows the first 4 strokes of the first cycle, represent the values of the approximate angles where variations occur. In 1—the dual connecting rod is locked. In 2—the dual connecting rod is released. In 3—is the intake. In 4—is the DTB, the decoupling device 40 activates the cam 230 and unlocks the piston-connecting rod-crankshaft assembly, the skirt of the piston 70 rests on the surface 245 of the support 30 and begins to shorten until the top end 180 of the bottom section of the dual connecting rod 20 made contact with the bottom end 170 of the top section of the dual connecting rod 20. In 6—DTS, the pin 190 of the top section 120 of the dual connecting rod 20 rests on the retractable support 200 being locked through the guide 235.

By integrating the dual connecting rod, the piston support, and the connecting rod decoupling device according to the present invention to a standard engine, the dead points DP of a conventional internal combustion engine cycle are converted into dead times DT. Thus, creating the mechanical conversion of the internal combustion engine of 4 strokes into 8 strokes, which add 4 additional strokes to the standard strokes of intake-compression-combustion-exhaust. The additional strokes are 2 bottom dead times (DTB) and 2 top dead times (DTT).

In the present invention, the piston remains stationary during the DTT and DTB in almost ⅓ of the time that it takes for the crankshaft to turn.

The prior art shows some of the elements which are also used in the present invention. But the prior art fails to use these elements in a sequential and synchronized way, in order to extend the DC and DT in DTB and DTT.

In addition, the prior art failed to keep the piston stationary from the beginning of the dead times.

This novelty of maintaining extended the dead centers to dead times is actually a feature that gives the inventive step (not obvious) to the present invention.

The prior art discloses several patents directed to extendable connecting rods but none of them discloses the dual behavior or includes the mechanical structure required by the present invention. In addition, none of the connecting rods of the prior art reproduces the internal mechanism of disengagement of the piston with the crankshaft, nor has a piston support fixed to the cylinder with a retractable device, or an element of disengagement of the piston in the DTB usually located on the crankshaft, and in addition that all act in synchronized and sequential manner to extend the dead points in the dead times.

All of the time that last the 8 cycles (including downtime DT) the crankshaft remains rotating, as it does in a standard engine, while the piston was stopped 4 strokes, (2 times by each DT making a total of ⅓ of the rotation total time).

In one embodiment, a dual connecting rod, the piston support, and the connecting rod decoupling device according to the present invention may be used to convert a 2 stroke engine into a 4 stroke engine.

Advantages

The main advantages obtained with the present invention in comparison with standard engines are:

in the intake stroke there is a longer preheating of the mixture;

in the compression stroke there is an improvement of the emulsion of the mixture subjected for longer time to high pressure and more complete lighting of the mixture;

in the combustion there is greater power results to apply the thrust force of the piston after a fraction of a second to the piston was stationary in the DTT, about the time of the lever that is generated by the projection of forces on the radius form by the crank pin metals and the axis of the crankshaft, as it moves away from the center of the axis of the crankshaft it is generated a better mechanical lever; and in the exhaust the exit of the gases is performed with lower power consumption as the gases are freely drained during one longer opening time of the exhaust valve in the DTB. And also are added the advantages obtained in the DT.

During the time that lasts the DTB: cooling of the cylinder head at the same time that begins to heat the fuel mixture located inside the combustion chamber and a better filling of the cylinder by taking advantage of the inertia of the gases in the intake by keeping the piston stationary and the intake valve open.

During the time it takes the DTS: the mixture is emulsified at high pressure for a period of time equal to the period of time that the piston remains in this position, i.e. approximately ⅙ of the total time of a revolution.

Gaining in the combustion because of the DTS is among others, greater power gaining by applying the force with better mechanical lever of the force moment exerted on the crankshaft. With a better use of the combustion force, being up to 5 times higher than in conventional engines. Another advantage is that in the 8 times the same cylinders (equal piston diameter and equal run) of a conventional engine, the radius formed by the axis of the crankshaft and the stump is 15% longer than the standard, with a better use of the moment of the applied force.

In addition to these gaining, are those obtained by being less the energy loss by various factors, among which can be mentioned as an example: friction, buckling, cooling system, compression of the system "piston-connecting rod-crankshaft".

Summing up the Gaining:
Lower consumption approximately 70% less
Less time of the active cycle
Less heat loss in the combustion chamber
Better emulsion of the fuel
Lower production of nitrous oxide
Reduced production of carbon monoxide
Lower consumption of oxygen
More useful power
It allows Teflon rings
Effective possibility of cushioning the combustion force with damping (damper)
Less wear ovalizer
Reduction of the engine size in approximately 5 times (for equal power of a conventional engine)

For better understanding of the invention, attached are the figures corresponding to an example of realization of the present invention, where equal numbers correspond to the same part.

What we claimed is:

1. A converting mechanical system comprising:
a dual connecting rod having a top section and a bottom section, the top section of the dual connecting rod is adapted to be pivotally connected to a piston on a conventional internal combustion engine, the bottom section of each dual connecting rod is adapted to be connected to a crankshaft of a conventional internal combustion engine;
a support surrounding each dual connecting rod, the support including a retractable device; and
a decoupling device adapted to be located on the crankshaft a conventional internal combustion engine; and
wherein the dual connecting rod has a first working position and a second working position, in the first working position the dual connecting rod is rigid and connected to the crankshaft when the piston moves, in the second working position the dual connecting rod disconnects the crankshaft from the piston by action of the decoupling device, the first section of dual connecting rod remains attached to the piston and is stationary at a beginning of each dead center of a conventional internal combustion engine, the second section of dual connecting remains attached to the crankshaft and is mobile, the piston rests on the support, the dual connecting rod attaches the crankshaft to the piston at an end of each dead center of a conventional internal combustion engine.

2. The converting mechanical system according to claim 1, wherein the top section of the dual connecting rod includes a pin mounted on a sliding slot supported on the retractable device; wherein the bottom section of the dual connecting rod includes:
a head having a hole, the hole houses a crankshaft stump;
a fixed trigger that actions the release of the retractable device on the support by activating a stopper to release the piston; and
a decoupling cam located near the head, the decoupling device rotates the decoupling cam to disconnect the crankshaft from the piston.

3. An internal combustion engine comprising:
at least one cylinder;
an intake valve connected to each cylinder to admit aft into each cylinder;
an exhaust valve connected to the cylinder to release gases out of each cylinder;
a piston operatively connected to each one of the cylinders, each piston having a first end and a second end, the first end of each piston is connected to the corresponding cylinder;
a crankshaft having a first end and a second end, the first end of the crankshaft designed to be connected to an external force device;
a converting mechanical system including:
a dual connecting rod having a top section and a bottom section, the top section of each dual connecting rod is pivotally connected to the corresponding piston, the bottom section of each dual connecting rod is connected to the second end of the crankshaft;
a support surrounding each dual connecting rod, the support including a retractable device; and
a decoupling device located on the crankshaft; and
wherein the dual connecting rod has a first working position and a second working position, in the first working position the dual connecting rod is rigid and connected to the crankshaft when the piston moves, in the second working position the dual connecting rod disconnects the crankshaft from the piston by action of the decoupling device, the first section of dual connecting rod remains attached to the piston and is stationary at a beginning of each dead center of a conventional internal combustion engine, the second section of dual connecting remains attached to the crankshaft and is mobile, the piston rests on the support, the dual connecting rod attaches the crankshaft to the piston at an end of each dead center of a conventional internal combustion engine.

4. The internal combustion engine according to claim 3, wherein the piston is stationary in the beginning of the dead centers for a period of time of approximately ⅓ of a total time of a turn of 360° of the crankshaft.

5. The internal combustion engine according to claim 3, wherein the top section slides into the bottom section of the dual connecting rod.

6. The internal combustion engine according to claim 3, wherein the support is a ring.

7. The internal combustion engine according to claim 3, wherein the top section of the dual connecting rod includes a pin mounted on a sliding slot supported on the retractable device.

8. The internal combustion engine according to claim 3, wherein the bottom section of the dual connecting rod includes:
a head having a hole, the hole houses a crankshaft stump;
a fixed trigger that actions the release of the retractable device on the support by activating a stopper to release the piston; and
a decoupling cam located near the head, the decoupling device rotates the decoupling cam to disconnect the crankshaft from the piston.

9. A method for converting a 4 stroke internal combustion engine into an 8 stroke internal combustion engine, the method comprising the steps of:

1) placing on an internal combustion engine a mechanical system, the internal combustion engine including at least one cylinder, an intake valve connected to each cylinder to admit air or mixture into each cylinder; an exhaust valve connected to the cylinder to release gases out of each cylinder, a piston operatively connected to each one of the cylinders, each piston having a first end and a second end, the first end of each piston is connected to the corresponding cylinder, a crankshaft having a first end and a second end, the first end of the crankshaft designed to be connected to an external force device;
the mechanical system including:
   a dual connecting rod having a top section and a bottom section, the top section of each dual connecting rod is pivotally connected to the corresponding piston, the bottom section of each dual connecting rod is connected to the second end of the crankshaft;
   a support surrounding each dual connecting rod, the support including a retractable device; and
   a decoupling device located on the crankshaft; and
wherein the dual connecting rod has a first working position and a second working position, in the first working position the dual connecting rod is rigid and connected to the crankshaft when the piston moves, in the second working position the dual connecting rod disconnects the crankshaft from the piston by action of the decoupling device, the first section of dual connecting rod remains attached to the piston and is stationary at a beginning of each dead center of a conventional internal combustion engine, the second section of dual connecting remains attached to the crankshaft and is mobile, the piston rests on the support, the dual connecting rod attaches the crankshaft to the piston at an end of each dead center of a conventional internal combustion engine;
wherein the top section of the dual connecting rod includes a pin mounted on a sliding slot supported on the retractable device;
wherein the bottom section of the dual connecting rod includes:
a head having a hole, the hole houses a crankshaft stump;
a fixed trigger that actions the release of the retractable device on the support by activating a stopper to release the piston; and
a decoupling cam located near the head, the decoupling device rotates the decoupling cam to disconnect the crankshaft from the piston;

2) creating an intake stroke, the intake stroke is created when the piston moves and the dual connecting rod is rigid and elongated, the top section of the dual connecting rod 2 is locked with the bottom section of the dual connecting rod forming a rigid unit with the piston, the connecting rod, and the crankshaft;

3) creating a bottom dead time, the bottom dead time is created when the dual connecting uncouples the piston and the crankshaft and the top section and bottom section of the dual connecting rod are disconnected;

4) creating a compression stroke, the compression stroke is created when the piston moves, the dual connecting rod is rigid and short, the top section and the bottom section of the dual connecting rod are in contact forming a rigid unit with the piston, the connecting rod, and the crankshaft;

5) creating a first top dead time, the first top dead time is created when the piston is disconnected from the crankshaft, the top section and the bottom section of the dual connecting rod is disconnected, and the piston, the dual connecting rod, and the crankshaft are disconnected;

6) creating a combustion stroke, the combustion stroke is created when the piston moves and the dual connecting rod is rigid and elongated;

7) creating a second bottom dead time, the second bottom dead time is created, the bottom section of the dual connecting rod that is connected to the crankshaft continues rotating, when the dual connecting rod reaches its minimum amplitude;

8) creating an exhaust stroke, the exhaust stroke is created when the dual connecting rod is short and rigid; and 9) creating a second top dead time, the second top dead time is created when the piston is disconnected from the crankshaft, the top section and the bottom section of the dual connecting rod is disconnected, and the piston, the dual connecting rod, and the crankshaft are disconnected; the decoupling device is located on the crankshaft activates a cam to push the device for the rollers to leave the fixed box allowing the dual connecting rod to start to shorten, the piston is stationary, disconnected from the crankshaft and the support.

* * * * *